Figure 1:
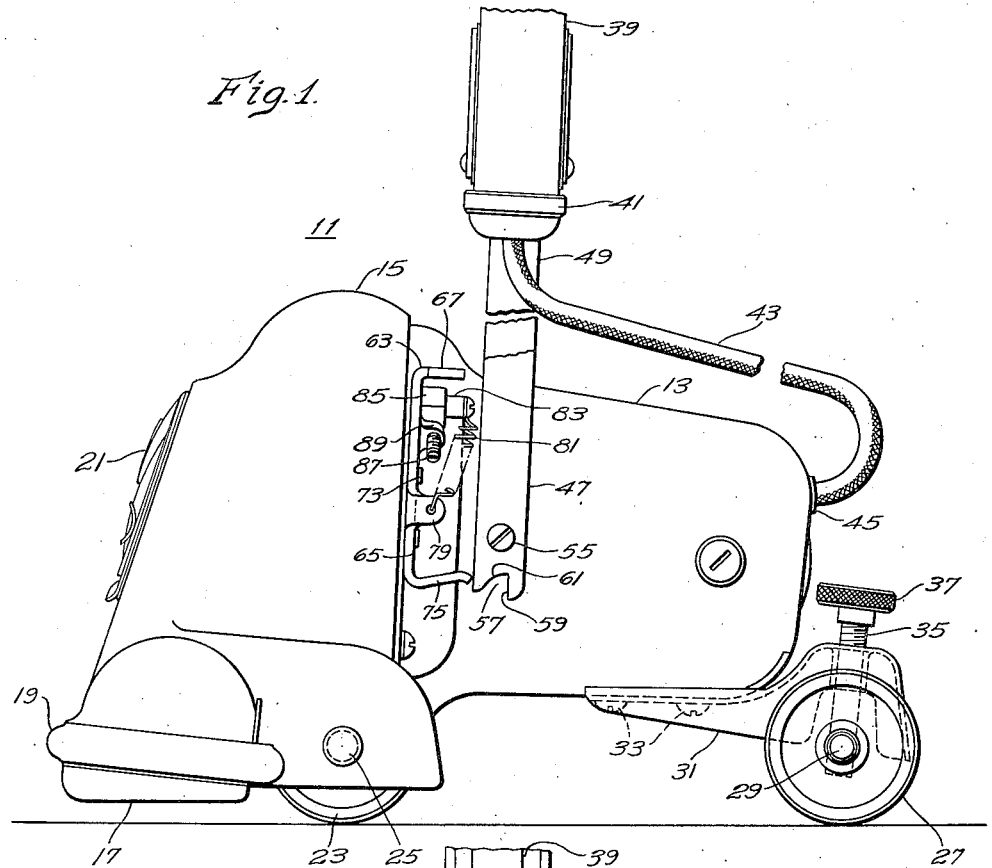

Feb. 23, 1937.  R. H. JORDAN  2,071,838
VACUUM CLEANER
Filed June 1, 1935  2 Sheets-Sheet 1

WITNESSES:
CJ Weller
Wm. C. Groome

INVENTOR
Richard H. Jordan.
BY
W R Coley
ATTORNEY

Feb. 23, 1937.   R. H. JORDAN   2,071,838
VACUUM CLEANER
Filed June 1, 1935   2 Sheets-Sheet 2
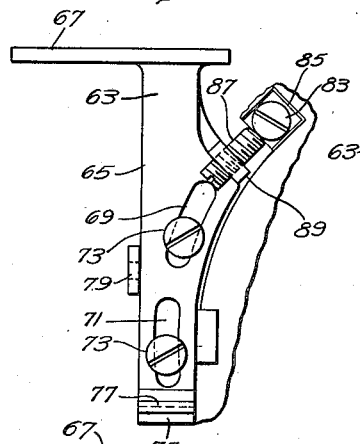
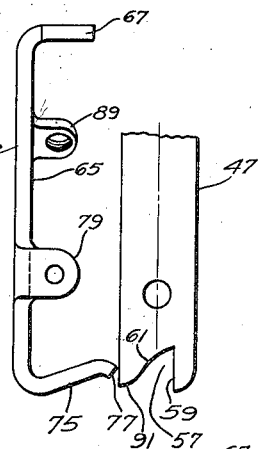
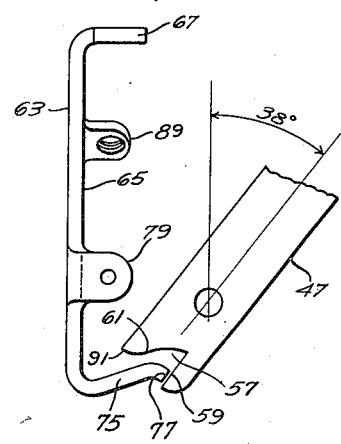
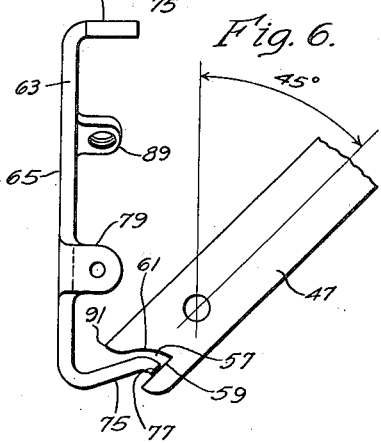
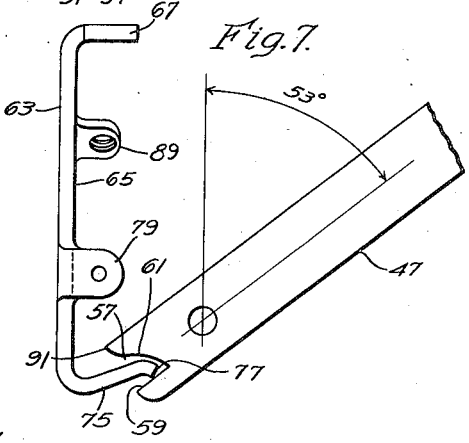
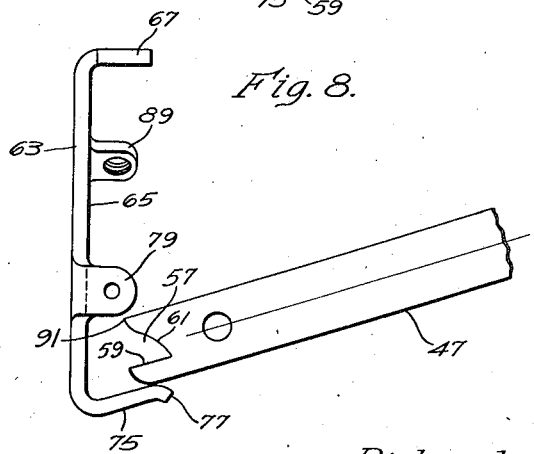
INVENTOR
Richard H. Jordan.

Patented Feb. 23, 1937

2,071,838

UNITED STATES PATENT OFFICE 2,071,838

VACUUM CLEANER

Richard H. Jordan, Springfield, Mass., assignor to Westinghouse Electric & Manufacturing Company, East Pittsburgh, Pa., a corporation of Pennsylvania Application June 1, 1935, Serial No. 24,528

12 Claims. (Cl. 306—4)

My invention relates to vacuum cleaners and particularly to handle tilting mechanisms therefor.

An object of my invention is to provide a relatively simple and effective means on the motor casing of a vacuum cleaner cooperating with the handle fork to hold it in substantially vertical position on the casing.

Another object of my invention is to provide a pedal lever on a vacuum cleaner casing cooperating with different parts of one prong of a handle fork to hold the handle in a substantially upright position on the casing, to permit limited turning movement thereon in a predetermined zone during operation and to permit limited turning movement thereon in another lower zone to accommodate the cleaner to different operating conditions.

Another object of my invention is to provide cooperating means on a pedal lever movably mounted on a vacuum cleaner casing and on a handle fork pivotally mounted on the casing to permit selective operation of the handle in a plurality of different positions by sequential movements of the lever and the handle fork and permitting easy and quick return of the handle to an upright position.

Another object of my invention is to provide means on a handle tilting mechanism associated with a vacuum cleaner that will permit of easily and quickly adjusting the same to permit use of the vacuum cleaner by short and by tall operators with equal convenience and ease of operation.

Other objects of my invention will either be pointed out hereinafter or will be apparent from the following description of one form of device embodying my invention now preferred by me.

In practicing my invention I provide a handle fork pivotally mounted on a casing enclosing one or more of the vacuum cleaner parts, one prong having a recess in the lower end edge. A pedal lever is mounted on the casing in such manner as to be vertically movable relatively thereto by the foot of an operator against a biasing spring. The pedal lever is provided with lateral extensions at the top and at the bottom end and may be adjusted vertically relatively to the casing.

Figure 2:
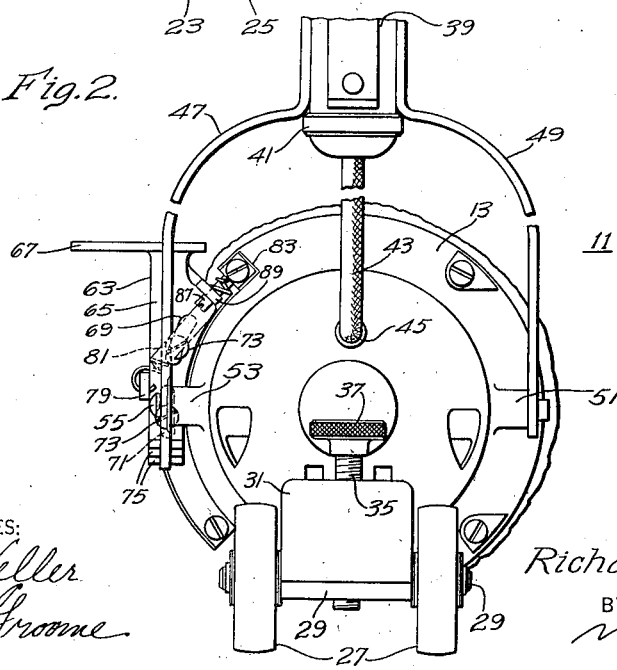

In the drawings,

Figure 1 is a view, in side elevation, of a vacuum cleaner embodying the device comprising my invention, Fig. 2 is a view, in rear elevation, of the parts shown in Fig. 1, Fig. 3 is a fragmentary view, in rear elevation, of parts of the device embodying my invention, Fig. 4 is a fragmentary view, in side elevation, of the pedal lever and its cooperating prong, shown in one position, Fig. 5 is a view, similar to Fig. 4 but with the prong shown in a different position, Figs. 6 and 7 are views similar to Fig. 5 but showing the pedal lever adjusted for respectively different positions, and, Fig. 8 is a view similar to Figs. 5 to 7, inclusive, but showing the prong in a still different position.

Referring first to Figs. 1 and 2 of the drawings, I have there illustrated a vacuum cleaner assembly, designated by the numeral 11, which assembly includes a motor casing 13 and a fan casing 15, which latter has either integral therewith or secured thereto a nozzle portion 17, which latter is located at the forward end of the vacuum cleaner assembly. I have illustrated the two casings or housings in order to show the location of the parts more particularly embodying my invention, and I desire it to be understood that the design and construction of the housings or casings constitute no part of my present invention.

A rubber bumper strap 19 may be associated with the nozzle portion 17 in a manner well known in the art and the upper part of the nozzle may have operatively associated therewith a rubber bumper 21 in order to reduce the possibility of damage to furniture by the vacuum cleaner when it is moved back and forth during use thereof. A pair of front wheels 23 are provided and are located either on a through shaft 25 or on stub shafts, as may be found suitable or desirable.

I provide further a set of rear wheels 27 mounted on the respective end portions of a short shaft 29 which is adapted to be adjusted in a substantially vertical direction in a bracket 31, which bracket is secured to the under side of motor casing 13 by a plurality of short machine screws 33, the bracket 31 extending rearwardly of the casing 13. Means for adjusting the wheels 27 relatively to the bracket 31, to thereby vary the distance between the mouth of the nozzle 17 and the floor or the surface on which the vacuum cleaner may be operating, comprises a screw threaded stud 35 having a knurled nut 37 fixedly secured at its top end, whereby an operator may turn the stud 35 in either one direction or the other, the stud 35 extending through the central portion of the shaft 29, so that turning movement of the stud 35 will vary the position of the shaft 29 and therefore of the wheels 27 relatively to the bracket 31.

The assembly includes further a handle 39 having a socket located therein at its lower end (this socket not being shown in the drawings), a connecting plug 41 being adapted to cooperate with the socket to permit of energizing a motor located within the casing 13, as by means of the twin conductor cord 43 extending between the plug 41 and the motor casing, and extending into the latter through an electric insulating bushing 45, all in a manner now well known in the art.

The handle 39 has secured thereto, at its lower end, a handle fork comprising two prongs 47 and 49, one at each side of the handle. The portion 49 is pivotally mounted on a short horizontally-extending stud 51 which may be integral with the motor casing. The portion 47 is also pivotally mounted on a similar short stud 53 and may be held thereon as by a short machine screw 55, in order that it may not inadvertently be separated from its pivotal support. The prong 47 extends a small distance downwardly below its pivotal support, the lower edge thereof having a recess 57, of substantially V-shape located therein. The rear side of this recess 57 is defined by a straight wall 59 extending substantially longitudinally of the prong 47, while the forward side of the recess is of arcuate shape and defined by a wall 61.

I provide further a pedal-operated lever 63 whose shape is shown more particularly in Figs. 3 to 8, inclusive, and which comprises a substantially vertically extending flat portion 65 having a lateral extension 67 at its upper end which may be engaged by the foot of an operator to momentarily move the same. The portion 65 is provided with a pair of arcuate slots 69 and 71, shown more particularly in Fig. 3 of the drawings, mounting screws 73 extending through the slots 69 and 71 and into a flange of the motor housing 13. A rearwardly projecting extension 75 is integral with the lower end of the lever 63 and is of the shape shown more particularly in Figs. 4 to 8, inclusive. In general it extends slightly angularly upwardly and its end portion is then bent downwardly again and its rear edge 77 is made substantially plane or flat.

The intermediate portion 65 is provided with a further lateral and rearwardly extending perforated lug 79 to receive one end of a biasing spring 81 whose lower end fits into the perforated lug 79 while its upper end is secured against a fixed lug 83 integral with or secured to either the rear wall of casing 15 or the forward end of casing 13. The lug 83 may be integral with another fixed lug 85 having a polygonal surface, here shown as being square in cross section, so that one of its faces may be engaged by the outer or upper end of an adjusting screw or stud 87, which screw or stud has screw threaded engagement with a still further extension or lug 89. It is to be understood that the mounting screws 73 are of such design and construction that the pedal lever 63 may move freely relatively thereto in a substantially annular direction whenever such movement is desired or effected by an operator.

Referring now to Fig. 4 of the drawings, I have there illustrated the relative positions of the pedal lever 63 and of the prong 47 when the handle fork and the handle mounted thereon are in substantially vertically upright position, that is when the vacuum cleaner is not in actual operation or use. As shown in Fig. 4 of the drawings, the handle is tilted slightly backwardly so that the front edge of the prong 47 engages the upper edge of the end 77 of the rearward extension 75, the length of the rearward extension 75 being such that when the handle fork is in this position, the handle will be tilted backwardly of a vertical line or plane passing through the pivot points.

Referring now also to Fig. 1 of the drawings, it will be noted that it is possible for an operator to move the handle forwardly until that portion of the prong 47 above the pivot point or stud 53 engages the rear edge of the upper extension 67. If the handle is left in this position, it will be tilted slightly forwardly of a vertical line or plane passing through the pivot points of the handle fork, so that the handle will be supported in a substantially upright position on the casing or the vacuum cleaner assembly, without danger of upsetting or overturning the vacuum cleaner assembly.

If the vacuum cleaner is to be used, in which case the operator will desire to move the vacuum cleaner back and forth on a floor or on a rug, it will of course be necessary that the handle and the handle fork move pivotally on the vacuum cleaner casing. In order to release the prong 47 it is only necessary that the operator step on the lever 63 to push it downwardly momentarily, then turning the handle and the handle fork in a clockwise direction, as seen in Fig. 1 of the drawings. If these two movements have been effected sequentially, the lever 63 being moved downwardly first and the handle then turned slightly, the positions of the two parts 47 and 63 may be those shown in Fig. 5 of the drawings. This will be the case if the adjusting screw 87 was initially turned in its lug 89 in such manner that the pedal lever 63 was moved downwardly relatively to the casing on which it is operatively supported. As noted in Fig. 5 of the drawings it will be possible to turn the handle through an angle of substantially 38 degrees rearwardly of a vertical plane. The engagement between wall 59 of prong 47 and the end 77 of extension 75 will limit the turning movement of the handle in a rearwardly direction relatively to the casing but will permit of reasonable forward turning movement of the handle on the casing, the limit being that prescribed by the requirement that the forward tip 91 of the fork 47 shall not move back of the end 77 of the extension 75, since if this did occur, the fork 47 would move into the position shown in Fig. 4 of the drawings where the handle is located in a substantially vertical position.

If an operator desires to have a greater range of turning movement of the handle relatively to the casing, particularly in a backwardly or clockwise direction, it is only necessary that the adjusting screw 87 be turned so that a shorter portion of its length extends above the lug 89 or in other words so that the pedal lever 63 is moved in an upward direction, by the action of the spring 81. An intermediate position, obtained as above described, is shown in Fig. 6 of the drawings and it will be noted that the end 77 of the rearward extension 75 is located farther up in the recess 57 and that it is now possible to turn the handle to a limiting position of 45 degrees back of a vertical plane.

Should the operator desire to have still further turning movement this can be obtained by effecting further upward movement of the pedal lever 63, by turning the adjusting screw 87 and, as shown in Fig. 7 of the drawings, it is now possible to turn the handle backwardly through an angle of substantially 53 degrees from the vertical. It will further be noted that the end 77 of the rearward extension 75 is now located at substantially the apex of the recess 57.

It may here be pointed out that it is possible to turn the handle forwardly of the positions shown in Figs. 6 and 7 in the same manner as was hereinbefore set forth in connection with the description of Fig. 5 of the drawings, the arcuate edge 61 of the recess 57 riding upon the upper rounded surface of the rear end 77 of the extension 75.

The adjustment of the pedal lever 63 to different positions on the casing, wherein it is possible to turn the handle and the handle fork through different amounts of rearward turning movement makes it possible to adapt a vacuum sweeper embodying my invention to be used by either an operator who is short or by an operator who is quite tall. This makes it very easy to adapt the vacuum cleaner for use by different operators and also makes it possible for an operator to adjust the mechanism more particularly embodying my invention to suit his or her own convenience or ideas as to the use of the device.

Referring now to Fig. 8 of the drawings, I have shown the relative positions of the pedal lever 63 and of the prong 47 when it is desired to have the handle move pivotally on the casing of the vacuum cleaner in an extremely low operating zone, that is where the handle is almost horizontal, as may be necessary or desirable when using the vacuum cleaner under certain kinds of furniture. In order to effect these positions it is only necessary for the operator to momentarily push down on the pedal lever, as by stepping on the extension 67 and at the same time turning the handle so that the rearward portion back of the wall 59 will move above the rearward extension 75. It will now be possible for an operator to effect limited turning movement of the handle relatively to the casing, the rear edge of the lower end of prong 47 riding upon the upper surface of the rear end of the extension 75, turning movement of the handle causing a slight vertical movement of the lever 63.

The device embodying my invention, as applied to a vacuum cleaner, thus makes it possible to initially hold a handle and a handle fork constituting a part of a vacuum cleaner assembly, in a substantially vertical position on the casing, with a very small turning movement so that the assembly will be in a substantially stable condition. By momentarily pressing the pedal lever downwardly and turning the handle an operator will be permitted to effect a predetermined degree or amount of backward turning movement of the handle, as is usual during operation of a vacuum cleaner, and it is easily possible to vary the amount or degree of turning movement in accordance with the desires of an operator or in accordance with the height of the operator using or operating the vacuum cleaner. The necessary changes are easily and quickly effected and if desired another operation of the pedal lever and further backward turning movement of the handle will permit of forward and backward turning movement of the handle in a lower rearward zone.

As will be obvious from Figs. 4 to 8 inclusive, it is only necessary for an operator to turn the handle forwardly, or in a counterclockwise direction as seen in Fig. 1 of the drawings in order to locate the handle in a substantially straight upward or vertical position. The rounded upper surface of the rear end of extension 75 will ride easily over the irregular contour of the lower edge of prong 47, thus making the operation of returning the handle to its inoperative position, a very easy one.

The device embodying my invention thus provides a relatively simple, inexpensive, and easily operated means for permitting of adjusting the operating zone of turning movement of a handle to either the desire or the height of an operator, the device permitting also of easy and quick operation to locate the handle in a still different and lower operating zone when it is desired to use the vacuum cleaner under furniture. The device embodying my invention ensures that the handle can be returned easily and quickly to its substantially upright position by merely turning the handle on the pivots of the handle fork to substantially vertical position, where it will be held by cooperating loose engagement between the pedal lever and one of the prongs.

While I have illustrated and described one particular embodiment of my invention, I do not desire to be limited thereto, since it is obviously possible to make changes therein, within the scope of the appended claims which are to be limited only by the prior art.

I claim as my invention:

1. A vacuum cleaner comprising in combination, a casing, a substantially vertically extending lever on the casing having top and bottom lateral extensions, and a handle fork pivotally mounted on the casing and adapted to engage the bottom lateral extension to prevent backward turning movement of the handle fork in one position thereof, the lower edge of one fork member being provided with a recess in which the bottom lateral extension of the lever may interfit to cause the handle fork to have turning movement on the casing in a predetermined limited zone.

2. A vacuum cleaner comprising in combination, a casing, a handle fork pivotally mounted on the casing and a lever member on the casing having an upper lateral extension to engage a fork member above its pivotal mounting and a lower lateral extension to engage a fork member below its pivotal mounting to limit turning movement of the handle fork relatively to the casing.

3. A vacuum cleaner comprising in combination, a casing, a handle fork pivotally mounted on the casing and a lever member on the casing having an upper lateral extension to engage a fork member above its pivotal mounting and a lower lateral extension to engage a fork member below its pivotal mounting to hold the handle fork in a substantially upright position on the casing with limited pivotal movement relatively thereto.

4. A vacuum cleaner comprising in combination, a casing, a handle fork thereon, a pivot pin for each member of the fork located near the lower end thereof, a substantially vertically-extending lever on the casing, a lower rearwardly extending lug on the lever engaging one fork member below the pivot pin to limit turning movement of the fork in one direction and an upper rearwardly-extending lug on the lever engaging said fork member above the pivot pin to limit turning movement of the fork in the other direction, the length of the lugs being such as to cause the handle fork to have limited turning movement on the casing in a substantially upright position.

5. A vacuum cleaner comprising in combination, a casing, a handle fork pivotally mounted on the casing, one of the fork members having a recess in its bottom edge, a substantially vertically-extending lever movably mounted on the casing and having a lateral extension at its lower end, the lateral extension engaging the recessed fork member at one side edge to hold it in a substantially vertical position on the casing and engaging in the recess to cause limited turning movement of the handle fork on the casing in a predetermined operating zone.

6. A device as set forth in claim 5 and including cooperating means on the casing and on the lever to vary the position of the zone relatively to the casing.

7. A vacuum cleaner comprising in combination, a casing, a handle fork pivotally mounted on the casing, one of the fork members having a recess in its bottom edge, a substantially vertically-extending lever movably mounted on the casing and having a lateral extension at its lower end, a spring connecting the casing and the lever to yieldingly hold the lever in one position where the lateral extension thereon engages a side edge of one fork member to hold it in substantially vertical position and prevent backward turning movement thereof on the casing.

8. A vacuum cleaner comprising in combination, a casing, a handle fork pivotally mounted on the casing, one of the fork members having a recess in its bottom edge, a substantially vertically-extending lever movably mounted on the casing and having a lateral extension at its lower end, a spring connecting the casing and the lever to yieldingly hold the lever in one position where the lateral extension thereon engages a side edge of one fork member to hold it in substantially vertical position, sequential movement of the lever and of the handle fork effecting engagement of the end of the lateral extension in the recess in said fork member permitting limited turning movement of the handle fork on the casing in an operating zone.

9. A vacuum cleaner comprising in combination, a casing, a handle fork pivotally mounted on the casing, one of the fork members having a recess in its bottom edge, a substantially vertically-extending lever movably mounted on the casing and having a lateral extension at its lower end, a spring connecting the casing and the lever to yieldingly hold the lever in one position where the lateral extension thereon engages a side edge of one fork member to hold it in substantially vertical position, a momentary downward movement of the lever and a turning movement of the handle fork effecting interfitting engagement of the end of the extension in the recess to permit pivotal movement of the handle fork on the casing during operation of the vacuum cleaner in one zone and a second momentary downward movement of the lever and a further turning movement of the handle fork effecting location of the lower end of one of the hande fork members above the lateral extension to permit pivotal movement of the handle on the casing in another zone.

10. A vacuum cleaner comprising in combination, a casing, a handle fork pivotally mounted on the casing and having a recess in the bottom edge of one of the fork members, a pedal lever movably mounted on the casing, spring biased to one position thereon and having a lateral extension at its lower end extending toward the handle fork, sequential movement of the lever and of the handle fork effecting location of the end of the extension in the recess to permit pivotal movement of the handle fork relatively to the casing in a predetermined upper zone and a second sequential movement of the lever and of the handle fork effecting location of the recessed fork member above the extension to permit pivotal movement of the handle fork relatively to the casing in a predetermined lower zone.

11. A device as set forth in claim 10 in which the shapes of the lateral extension on the lever, of the recess and of the rear edge of the end of the fork are such that the handle fork is returnable to a substantially upright position by a single continuous turning movement thereof.

12. A vacuum cleaner comprising in combination, a casing, a handle fork pivotally mounted on the casing, a pedal-operated lever on the casing, spring biased to one position thereon and including a lateral extension at its lower end having loosely-interfitting engagement with the lower end of one of said fork members to permit limited pivotal movement of the handle fork on the casing in a predetermined operating zone and an adjusting screw on the lever operatively engaging the casing to effect upward movement of the lever on the casing whereby to lower the predetermined operating zone.

RICHARD H. JORDAN.